US006920234B1

(12) United States Patent
Koenig et al.

(10) Patent No.: US 6,920,234 B1
(45) Date of Patent: Jul. 19, 2005

(54) METHOD AND DEVICE FOR MONITORING THE INTERIOR AND SURROUNDING AREA OF A VEHICLE

(75) Inventors: Winfried Koenig, Pfinztal (DE); Bernd Hürtgen, Sibbesse (DE); Werner Pöchmüller, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/743,305

(22) PCT Filed: May 5, 2000

(86) PCT No.: PCT/DE00/01426

§ 371 (c)(1), (2), (4) Date: Mar. 5, 2001

(87) PCT Pub. No.: WO00/68910

PCT Pub. Date: Nov. 16, 2000

(30) Foreign Application Priority Data

May 8, 1999 (DE) ........................................ 199 21 488

(51) Int. Cl.[7] ................................................ G06K 9/00
(52) U.S. Cl. ...................................................... 382/103
(58) Field of Search ................................ 382/103, 104, 382/143–144, 148–149; 396/9, 322, 326, 332, 427, 471; 348/148, 143, 144, 149

(56) References Cited

U.S. PATENT DOCUMENTS 5,065,236 A * 11/1991 Diner .......................... 348/54
5,293,427 A * 3/1994 Ueno et al. ................. 382/103
5,598,145 A 1/1997 Shimotani et al. .......... 340/576
5,642,093 A * 6/1997 Kinoshita et al. ........... 340/439
5,845,000 A * 12/1998 Breed et al. ................ 382/100
6,396,954 B1 * 5/2002 Kondo ....................... 382/224
6,654,019 B2 * 11/2003 Gilbert et al. .............. 345/474
6,690,374 B2 * 2/2004 Park et al. .................. 345/427

FOREIGN PATENT DOCUMENTS

| | | | |
|---|---|---|---|
| DE | 195 46 391 | | 6/1996 |
| DE | 197 36 774 | | 2/1999 |
| GB | 2224358 A | * | 5/1990 |
| JP | 10-35320 | * | 2/1998 |
| WO | WO 93/216515 | | 10/1993 |

OTHER PUBLICATIONS

"Die nuenen Augen des Autos, Limousinen lernen lesen," Bosch Zunder, Oct. 1998, p. 8, described in the specification.

* cited by examiner

*Primary Examiner*—Leo Boudreau
*Assistant Examiner*—Tom Y. Lu
(74) *Attorney, Agent, or Firm*—Kenyon & Kenyon

(57) ABSTRACT

A method and device for capturing a surrounding area and interior of a motor vehicle are described. The device for performing the method includes a camera device that has a beam path that points in a direction of the surrounding area of the vehicle, in particular a road, and has a beam path that points in a direction of the vehicle interior. A processing unit controls and evaluates the image information obtained.

37 Claims, 10 Drawing Sheets

METHOD AND DEVICE FOR MONITORING THE INTERIOR AND SURROUNDING AREA OF A VEHICLE

FIELD OF THE INVENTION

The present invention relates to a method and device for monitoring the interior and surrounding area of a vehicle.

BACKGROUND INFORMATION

The article "Die neuen Augen des Autos, Limousinen lernen lesen [Cars Get New Eyes, Limos Learn to Read]" published in the October 1998 issue of the journal *Bosch Zünder*, describes a method in which the area in front of the driver surrounding the vehicle is monitored by two video cameras. The image captured by the cameras is evaluated with regard to road signs that can be detected in the Then, the road signals are displayed to the driver via a display unit. In addition, the system captures the path of the road in order to control the direction of the headlamps so that the light cone falls on the road. If the car enters the shoulder, an audible and/or visual warning is triggered. Furthermore, a method that measures brain activity, in particular of the driver of a vehicle, and triggers an alarm if there are deviations from the normal awake status, is described in PCT Patent No. WO 93/21615. Herein, measurements are taken via electrodes placed on the driver's head.

SUMMARY

The method according to the present invention has the advantage that the interior of and the area surrounding a vehicle can be captured using just one camera device. In particular, this is feasible because the interior of the vehicle and the area surrounding the vehicle are captured alternately. Provided the system alternates sufficiently quickly between capturing the interior and capturing the surrounding area, loss of information arising from switching back and forth may be ignored, and just one camera device as opposed to two is required for the interior and the area surrounding the vehicle. Furthermore, only one processing unit for processing the image information obtained is required.

Moreover, it is advantageous that the interior of the vehicle is illuminated by a radiation source that is at least largely invisible to the human eye. This has the advantage that during night driving, when as a general rule the interior of a vehicle is not lit or is poorly lit, the interior can nevertheless be monitored by a camera that is sensitive to radiation emitted by the radiation source. Herein it is advantageous to use an infra-red radiation source, preferably one or more infra-red light-emitting diodes. This does not distract the driver, unlike a visible source.

Furthermore, it is advantageous to obtain an image of the interior from a superimposition of an image of the surrounding area and of the interior; a processing unit subtracts an image of the exterior only from this superimposition. As a result, when the system alternates between capturing the surrounding area and the interior, there is no need to interrupt recording of the exterior, because the system simply interrupts recording of the interior. As a result, there is no need for optical interrupt elements, such as in particular mechanical shutters or mirrors. In particular, if the interior is illuminated by an infra-red radiation source and the image of the interior is captured via an infra-red filter, an image of the interior is essentially only captured if the infra-red radiation source is activated. Thus alternating monitoring of the interior and the surrounding area is feasible via a switch-off/switch-on sequence for the infra-red radiation source provided the camera device has a further beam path which extends into the area surrounding the vehicle and can capture the area surrounding the vehicle.

Furthermore, it is advantageous to capture only the visible part of the surrounding area in a first process step, and to capture only the visible part of the interior in a second process step. Thus it is not necessary for the images of the interior and the surrounding area to be separated in processing terms, which means the processing unit in which the image data is evaluated does not have to be especially powerful. Herein, it is particularly advantageous to carry out the switching over between capturing the part of the surrounding area visible to the camera and capturing the part of the interior visible to the camera via an electro-optical light valve, in particular via a liquid crystal cell, which can be switched back and forth between a transparent mode and an absorptive mode based on a signal applied.

Furthermore, it is advantageous when switching back and forth between capturing image signals from the surrounding area and image signals from the interior to switch back and forth as soon as partial areas of the maximum area that can be captured by the camera device have been captured. In particular, switching back and forth may be carried out after image columns or image rows have been captured or after groups of pixels have been captured. As the image data also has to be transmitted to the processing unit and processed there, this method has the advantage that it allows quicker switching back and forth between capturing the interior and the exterior, so that the shift between two captured images, e.g., of the exterior, which is based on the movement of the vehicle, is reduced.

Furthermore, it is advantageous to capture the driver's face, in particular his eyes, as well as the road markings and, the position of the vehicle relative to the road markings. This information can be used to determine whether the driver may have fallen asleep and may therefore be driving in an uncontrolled manner, and can be used to activate a warning device that wakes up the driver. Since the driver's face is also captured, safety, as compared to conventional methods and devices, in which a camera device only captures the road markings, is increased. For example, when the vehicle is traveling in a straight line for a long period, the vehicle may travel for a considerable time within the road markings, even though the driver has already been asleep for a number of seconds. Using the method according to the present invention, it is possible to detect that the driver has fallen asleep in a case of this kind.

If the camera is used for monitoring, it is not necessary to place electrodes on the driver's body, which is necessary in the case of the method in which the driver's brain waves are monitored. Since electrodes of this kind may be cumbersome and may limit the driver's freedom of movement, and the driver may also forget to put them on when he starts driving or may deliberately not put them on because they are uncomfortable, a warning indicating that the driver has fallen asleep is easier to implement and less unpleasant for the driver to use. Furthermore, the method according to the present invention has the advantage that as well as monitoring the interior, the system can capture road signs in the area surrounding the vehicle and can therefore alert the driver, for example, to warning signs or speed limit signs via a visual or acoustic output unit.

Furthermore, it is advantageous to determine the number of people in the vehicle or, respectively, the seat occupancy.

This information can be used, for example, to control the chassis so as to compensate for an uneven load in the vehicle if, for example, people are only sitting on the left side of the vehicle, for example the driver and one person behind him. Furthermore, this information can be use to control a seat heater, which is only activated if someone is actually sitting on the seat. For example, it is possible to determine whether a seat is occupied or is occupied by a child seat, as it is advantageous that deployment of an airbag can be blocked if a seat is unoccupied or is occupied by a child seat. As a result, unnecessary deployments of an airbag can be avoided if the seat is unoccupied, and injury to a child by an airbag can be prevented if the seat is occupied by a child seat.

Furthermore, it is advantageous to also capture the lip movements of a predefinable person in the vehicle, for example the driver, in order to support a speech input system. If, for example, during speech input it is unclear, which command has been input due to driving noise, the driver's lip movements can be captured by the camera device and evaluated so as to check the speech input. This is possible, for example, if the lip movements are analyzed to determine whether the syllables that correspond to the lip movements captured are contained in the command understood by the speech input unit. If the speech input unit cannot make unambiguous assignments based on what it has understood, this can possibly be achieved by performing a comparison with the lip movements.

Furthermore, it is advantageous to provide a device to allow capturing of the area surrounding the vehicle and the vehicle interior. For example, it is advantageous to design a camera device so that one beam path points in the direction of the interior and one beam path points in the direction of the road, for example in the direction of travel, because as a general rule from the driver's point of view the road, i.e., the edge of the road, and objects in his own lane are the most important information in the area surrounding the vehicle.

Furthermore, it is advantageous to provide a deviation mirror that is semi-transparent in the camera device. One beam path, e.g., from the interior, may enter the camera device via reflection, and another beam path may enter via transmission through the semi-transparent mirror. As a result, there is no need for mechanical adjusting between the two beam paths. Furthermore, it is advantageous to design at least one deviation mirror to be concave or convex; as a result, the area that can be monitored by the camera can be limited or enlarged, depending on the use of the device.

Furthermore, it is advantageous to design the camera as, for example, a CCD camera or a CMOS camera. As a result, the camera device according to the present invention can be designed inexpensively. Furthermore, it is advantageous to equip the camera device with at least two cameras, so that stereoscopic image capturing is possible, and so that conclusions can be drawn regarding the distances between the vehicle and objects, and distances in the interior, respectively, by evaluating distance-dependent image shift.

In addition, it is advantageous to arrange the camera device in an upper part of the windshield or to integrate the camera device into the roof of the vehicle. A position at least close to the vehicle roof allows an especially good overview of the area surrounding the vehicle and the vehicle's interior.

Furthermore it is advantageous to design at least one deviation mirror so that it can be adjusted by an adjustment device so that at least the eyes and/or lips of the driver can be captured by the camera. This is useful if drivers alternate and are of different heights and may arrange the seat in different positions. Furthermore, it enables the driver's movements while driving to be taken into account. By designing the deviation mirror so that the visible range captured can be readjusted, it is possible to ensure that the driver's eyes and/or lips are always within the capturing area of the camera device. This ensures that the means for monitoring whether the driver has fallen asleep and the means for checking speech input function properly, especially during driving.

DETAILED DESCRIPTION

Figure 1:
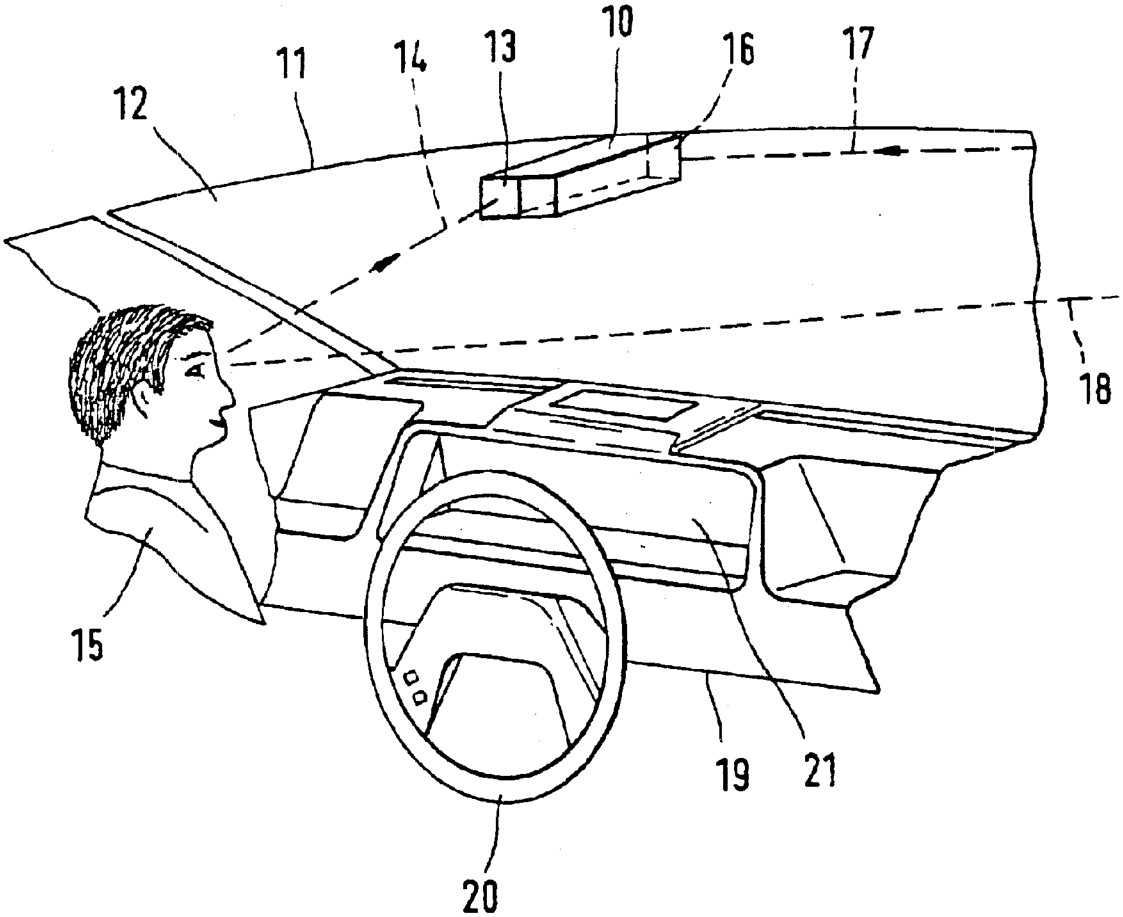
FIG. 1 shows an arrangement of a device according to the present invention in a motor vehicle.

In FIG. 1, a camera device 10 according to the present invention is arranged in a motor vehicle on upper edge 11 of a windshield 12. The camera device has a first optical opening 13. A first beam path 14 leading to a driver 15 of the vehicle. The mid-point beam of the beam path is shown. In addition, camera device 10 has a second optical opening 16, which is arranged on the side of camera device 10 opposite to first optical opening 13 and is therefore not visible in the view shown in the drawing. Therefore, second optical opening 16 is shown using a broken line. In addition, a second beam path 17, which leads from second optical opening 16 of camera device 10 through windshield 12 into the area surrounding the vehicle in front to the vehicle, is shown. The driver's line of sight, which is shown as a third beam path 18, extends in the same direction. Furthermore, cockpit 19 of the vehicle has a steering wheel 20 and a display unit 21. Herein, display unit 21 is embodied as, for example, a combination instrument in which a plurality of displays are integrated into one electronic unit. For example, a freely programmable combination instrument, in which various display instruments are shown on a screen, e.g., in the form of a liquid crystal display, is feasible. The figure also includes a processing unit, which processes the image information recorded by camera device 10, but this is not shown separately. The processing unit may be arranged in, for example, either the housing of camera device 10 shown, the vehicle roof on the other side of upper edge 11 of the windshield, or cockpit 19 of the vehicle. In an exemplary embodiment, the processing unit is arranged in a part of display unit 21 that is not visible to driver 15. As display unit 21 is used to output visual warning signals that are based on the evaluation by the processing unit of the image information recorded by camera device 10, e.g., if the driver is about to fall asleep or has exceeded the maximum speed limit, long data transmission paths can be avoided.

Camera device 10 is arranged in the upper part of windshield 12 close enough to the vehicle roof (not shown) so that the vehicle interior and the road in front of the vehicle can be monitored effectively. Therefore, the camera device is arranged, for example in the middle of the vehicle with respect to the sides of the vehicle. It is also feasible for it to be arranged in the left upper part of windshield 12 in a left-hand-drive vehicle, as this ensures that not only the driver but also the entire road can be effectively captured by the camera device. In a right-hand-drive car, the camera is arranged in a right upper section of windshield 12. First and second optical openings 13, 16 may be designed in various ways. Any of the following ways are feasible: A filter, an opening, a lens, or a combination thereof in which the aforementioned components are arranged behind one another.

Figure 2:
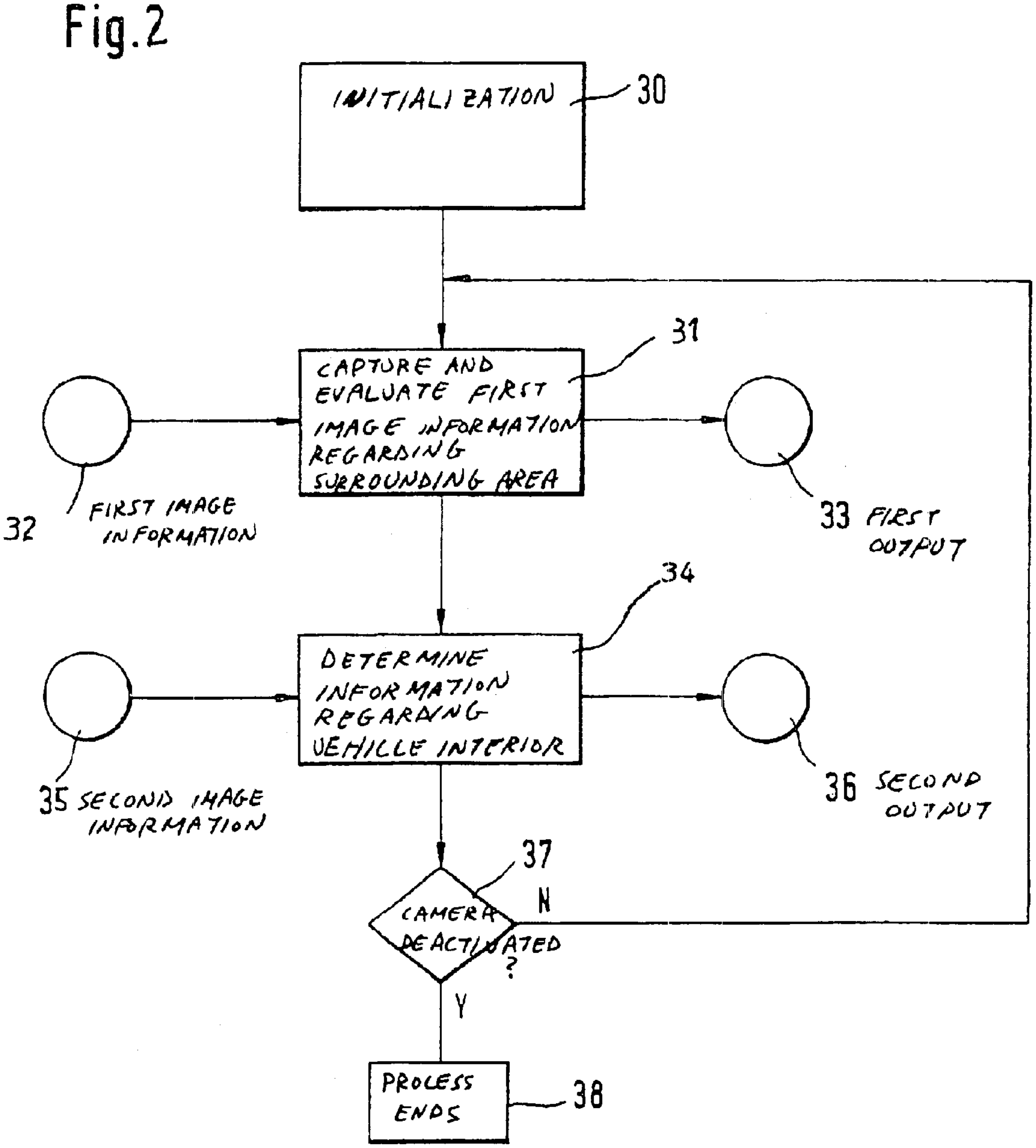
FIG. 2 shows a flow chart of a first embodiment of a method according to the present invention.

FIG. 2 shows a flow chart for the method according to the present invention. Starting from an initialization step 30, in a first process step 31 first image information 32 of the surrounding area is captured and evaluated by the processing unit. A first output 33 is output via visual and/or acoustic output media based on first image information 32. Thus the first output is based on the area surrounding the vehicle. In a subsequent second process step 34, image information regarding the vehicle interior is determined from second image information 35. In second process step 34, superimposed image information regarding the surrounding area and the vehicle interior is captured, based on first image information 32 regarding the surrounding area obtained previously. Image information regarding the vehicle interior is determined, by subtracting first image information 32 from second image information 35, so that based on the image information a second output 36 is obtained and output via visual and/or acoustic output media. The second output is dependent on the image information regarding the vehicle interior. In a subsequent decision step 37, the process is aborted if the camera device is deactivated, i.e., if the vehicle is turned off. This decision path is shown as Y in the drawing. In this case, the process ends when the camera device is switched off in a subsequent process step 38. If the vehicle is not turned off, processing branches back to first process step 31. This decision path is shown as N in FIG. 2.

Figure 2A:
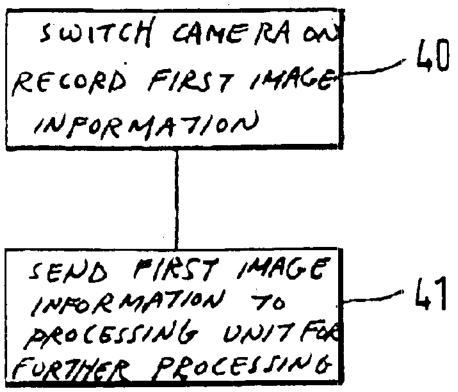
FIG. 2*a* shows a first process step of a method according to the present invention.

In FIG. 2*a*, first process step 31 is shown in detail. In a first sub-step 40, the camera device is switched on and first image information 32 is recorded. In a second sub-step 41, first image information 32 is sent to the processing unit for further processing.

Figure 2B:
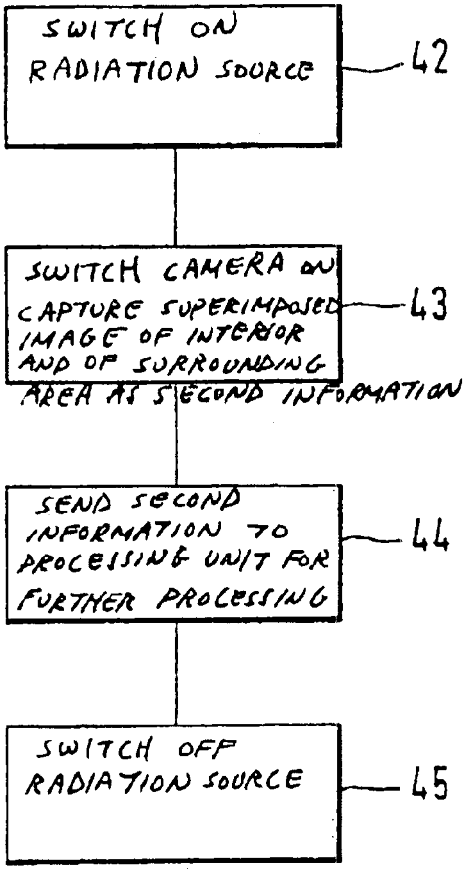
FIG. 2*b* shows a second process step of a method according to the present invention.

In FIG. 2*b*, second process step 34 is subdivided into sub-steps. In a first sub-step 42, the radiation source that is not visible to the human eye is switched on by being supplied with electrical voltage. In a second sub-step 43, camera device 10 is switched on and a superimposed image of the interior and the surrounding area is captured as second image information 35. In addition, a lighting adjustment must be performed based on the lighting conditions, e.g., via an adjustable diaphragm opening or adjustment of the current applied to the light-sensitive sensors of the camera device. In a third sub-step 44, after the image has successfully been recorded, second image information 35 is stored and sent to the processing unit for further processing. In a fourth sub-step 45, the radiation source that is not visible to the human eye is switched off. The image of the interior is then determined in a processing step (not shown in FIG. 2*b*) in the processing unit.

Figure 2C:
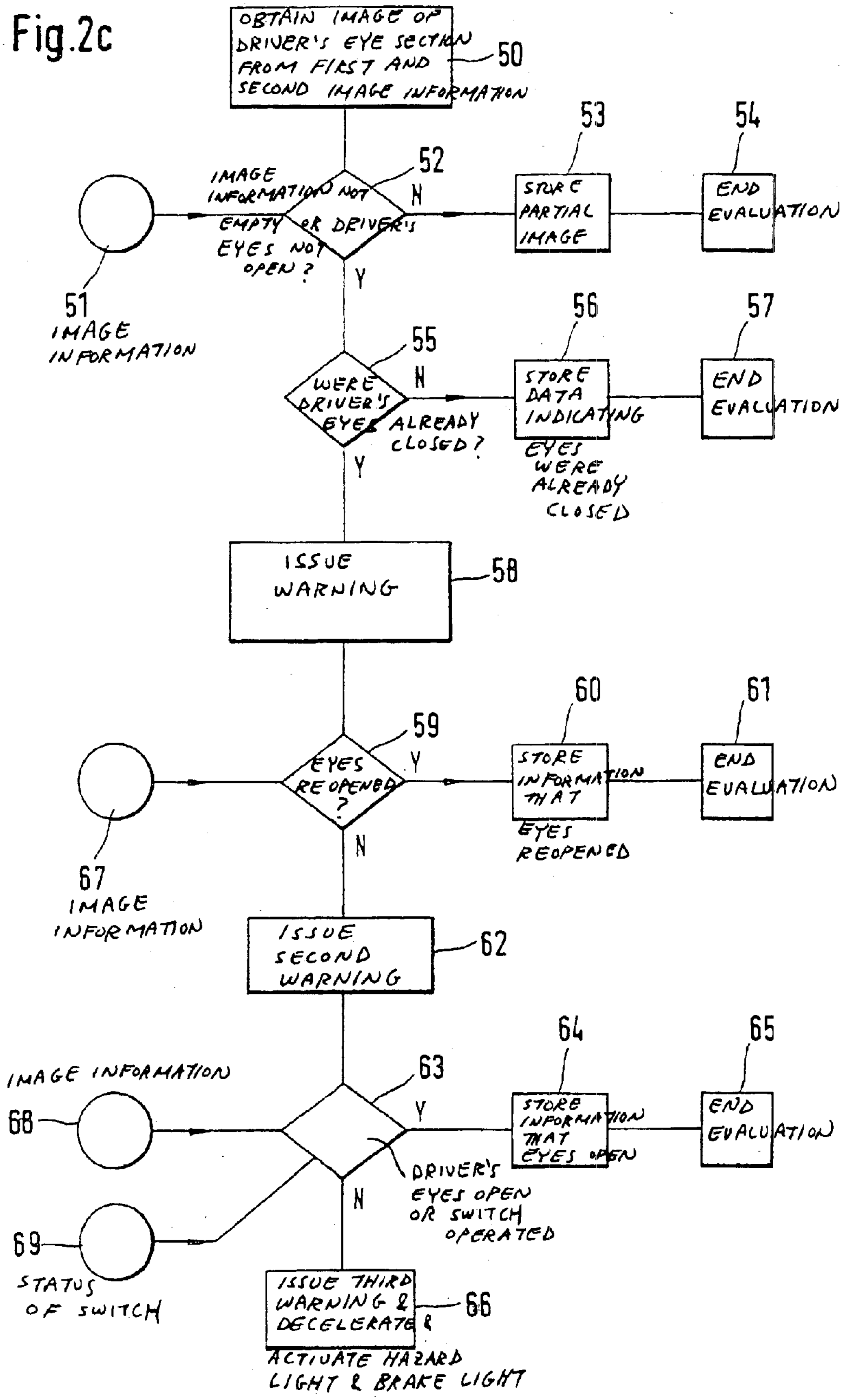
FIG. 2*c* shows an evaluation method according to the present invention.

FIG. 2*c* shows an evaluation process carried out by the processing unit that includes processing of the image information recorded by the camera device, first output 33, and second output 36, respectively. An example of an evaluation process is a falling-asleep warning generated by monitoring driver 15, monitoring of the vehicle's interior being necessary and second output 36 consequently being output. A method for detecting the surrounding area, e.g., for detecting road signs and/or road markings, can be embodied in a similar manner, first output 33 being output.

In a first initialization step 50, the processing unit obtains an image of the driver's eye section from first and second image information 32 and 35. In a first decision step 52, the recorded image is compared with image information 51 regarding the driver's eye section that has been stored previously. Herein, image information 51 is an empty image if the vehicle has just been started up and as yet no image information has been stored. If it is determined that the driver's eyes are open, i.e., the driver is not asleep, or if image information 51 is an empty image, processing branches along decision path N, and in process step 53 the recorded partial image is stored. Furthermore, the fact that the driver is awake at the time the image was recorded is stored in another memory. The evaluation process is ended in a completion step 54. The evaluation process is started again the next time first and second image information 32 and 35, respectively, are transmitted to the processing unit. A new start is performed each time the evaluation process ends provided the vehicle or the camera device have not been switched off.

If the processing unit determines that the driver's eyes are closed, processing branches from first decision step 52 to a second decision step 55 along decision path Y. Here, a check is performed to determine whether the driver's eyes were already closed the last time an image was recorded. If not, processing branches to a sub-step 56, where data is stored indicating that the driver's eyes are closed at the point in time the image was recorded. In a completion step 57, the evaluation process is ended. If the driver's eyes are already closed the last time an image was recorded, processing branches along decision path Y from second decision step 55 to a first warning step 58. This warning is an audible warning and/or a visual warning, for example via display unit 21. Because a warning is not issued until a second image has been recorded and thus after second decision step 55, it is generally possible to avoid a situation where a warning is issued because, by chance, the image was taken exactly at the moment the driver blinked, thus causing camera device 10 to detect that the driver's eyes are closed.

After first warning step 58, a third decision step 59, in which image information 67 regarding a further image of the driver's face section is taken into account, is performed. If the driver's eyes have reopened, processing branches along decision path Y to a processing step 60, and image information 67 that has been newly recorded is stored. Furthermore, data indicating that the driver's eyes are open is stored in a memory. The evaluation process is ended in a subsequent completion step 61. However, if the driver's eyes are still closed, processing branches from third decision step 59 along decision path N to a second warning step 62. In second warning step 62, a significantly louder audible warning is issued than that issued in first warning step 58. In a fourth decision step 63, image information 68 regarding the driver's facial section is captured again and status 69 of a switch is queried. If it is determined that the driver's eyes are now open or if the driver operates the switch, processing branches along decision path Y. In a first sub-step 64, data indicating that the driver's eyes are open is stored and the evaluation process is ended in a completion step 65. If it is not determined that the driver's eyes are open or if it is not determined that the switch has been triggered, processing branches along decision path N to a third warning step 66. A loud audible warning is now issued again, and the vehicle is decelerated, the hazard warning lights system and the brake lights being activated so that driverless driving is avoided. As there are circumstances in which the camera device cannot obtain an image of the driver's eyes, e.g., if he is wearing sunglasses, the process shown in FIG. 2*c* can be deactivated.

Furthermore, it is possible to increase the number of times the image information regarding the driver's eye section is queried before an appropriate warning step is performed, so as to avoid incorrect issuing of warnings. Herein, the number of queries is based on how frequently image information regarding the interior is captured. The process shown in FIG. 2*c* may also be used to monitor the vehicle's position relative to a road marking if, instead of capturing image information regarding the driver's facial section, image information regarding the road marking is captured and the vehicle's position relative to the road marking is evaluated.

Figure 3:
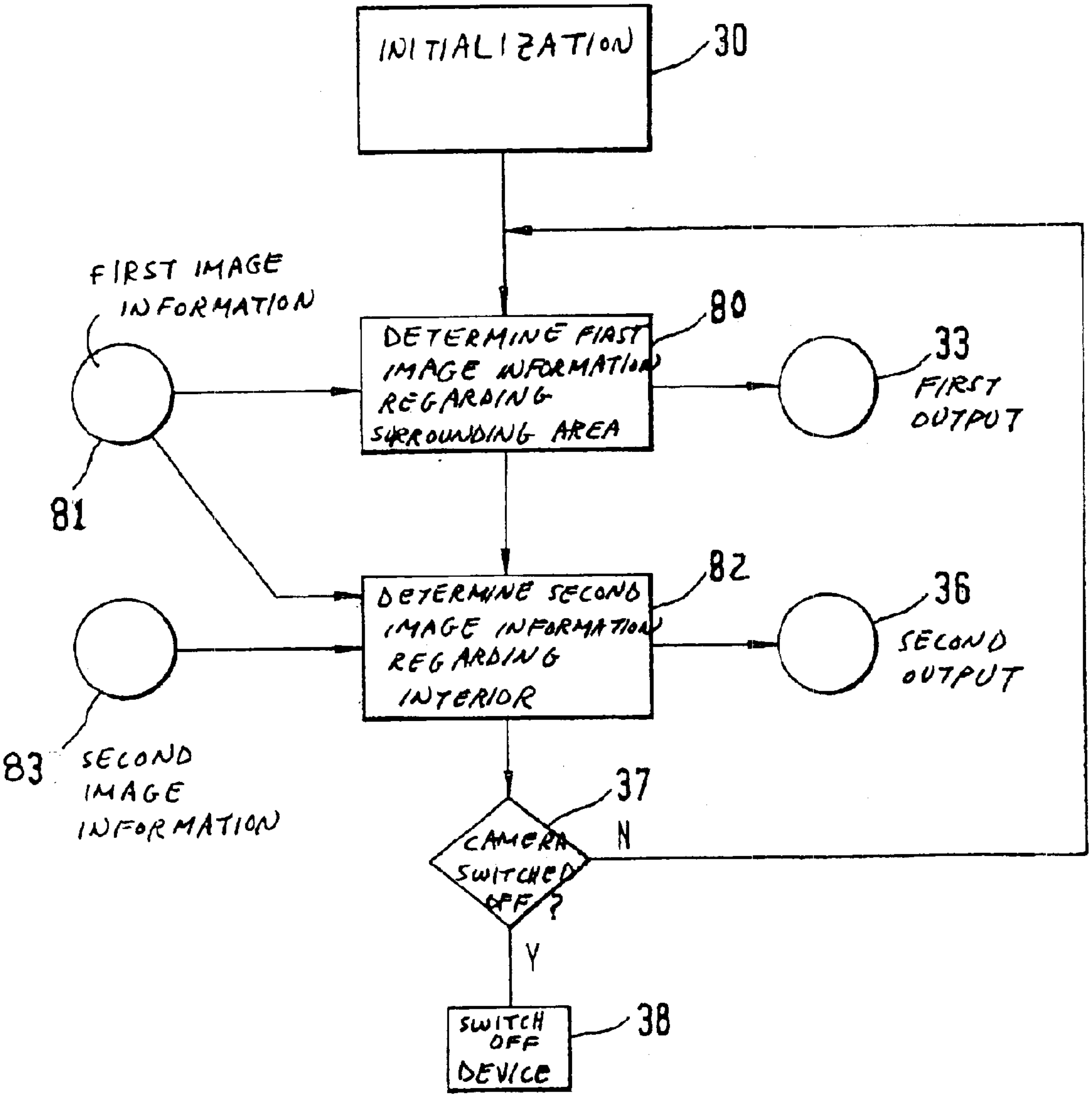
FIG. 3 shows a flow chart for a second embodiment of a method according to the present invention.

FIG. 3 shows a further method according to the present invention for monitoring the area surrounding the vehicle and the vehicle interior. The same reference numbers represent the same process elements as those in FIG. 2. Following an initialization step 30, in a first process step 80 first image information 81 regarding the vehicle's surrounding area is determined, sent to the processing unit, and first output 33 is output based on first image information 81. In second process step 82, second image information 83 regarding the interior is captured by the camera device and sent to the processing unit. Second output 36 is output based on the image information captured. During first process step 80, an electro-optical light valve in the direction of the vehicle's surrounding area is opened. In second process step 82, an electronic light valve in the direction of the vehicle's interior is opened. After second process step 82, a decision step 37 is performed. If the camera device is switched off, processing branches along decision path Y and the camera device is switched off in a subsequent process step 38. Otherwise, processing branches back to first process step 80 via decision path N. Herein, in a an exemplary embodiment, in first and second process steps 80, 82 the light valve in question is only opened for 90% of the duration of the process step in question. This ensures that the two sets of image information to be recorded do not overlap. For example at low temperatures, this keeps the image information to be recorded from overlapping, as low temperatures may cause the liquid crystal's switching behavior to become sluggish. The evaluation process described in FIG. 2*c* can be applied directly to the first output and/or second output 36 in FIG. 3.

Figure 4:
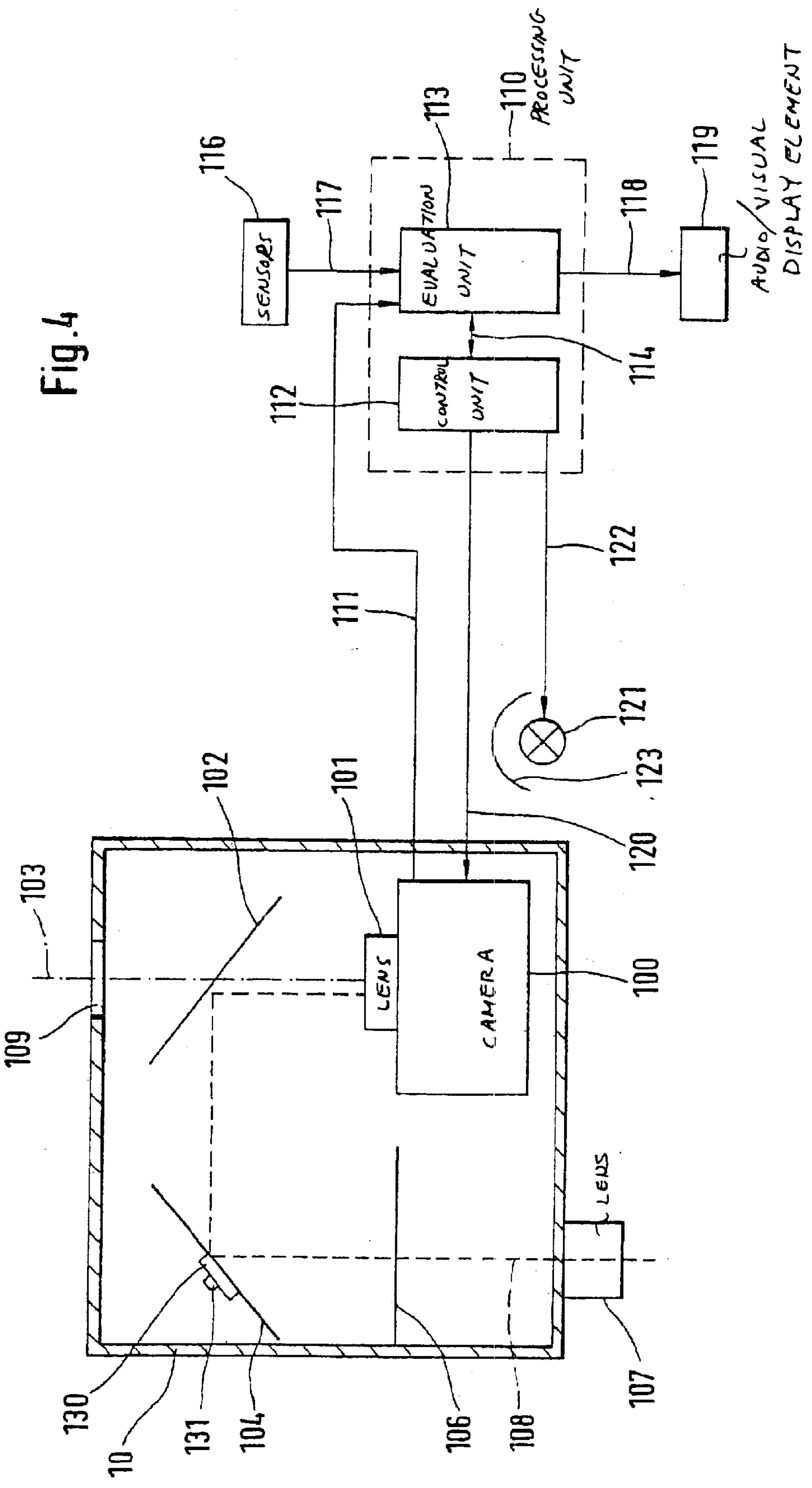
FIG. 4 shows a first embodiment of a device according to the present invention.

FIG. 4 shows an embodiment according to the present invention of a camera device 10 that has a processing unit 110. Camera device 10 is arranged in a housing in which a camera 100, which is designed as, for example a CCD camera or a CMOS camera, is arranged with a first lens 101. Light from a first deviation mirror 102 enters first lens 101. First deviation mirror 102 is semi-transparent, so that a first beam path 103 from the vehicle's surrounding area passes through an opening 109 in the housing of camera device 10, then passes through first deviation mirror 102 and then through first lens 101 to camera 100. Furthermore, a second beam path 108 from a second deviation mirror 104 travels to first deviation mirror 102. Second beam path 108 is deviated by first deviation mirror 102 and travels to camera 100. Second beam path 108 travels from the vehicle interior and enters camera device 10 through a second lens 107. Before it reaches second deviation mirror 104, it passes through an infra-red filter 106. Camera 100 is connected to processing unit 110 via a first data circuit 111. Processing unit 110 includes a control unit 112 and an evaluation unit 113, which are connected to one another via a second data circuit 114. Evaluation unit 113 is connected via a third data circuit 117 to sensors 116 and via a fourth data circuit 118 at least to audible and/or visual display elements 119. Furthermore, control unit 112 is connected via a fifth data circuit 120 to camera 100 and via a sixth data circuit 122 to a radiation source 121, which emits radiation that is invisible to the human eye. Radiation source 121 is arranged in a housing, which, for example, is designed as a reflector 123.

First beam path 103 and second beam path 108 are denoted by the optical axis of the beam in question. Here and in FIGS. 5–7, only the midpoint beam, which represents the entire beam path, is shown. In front of lens 101, the optical axis of the two beam paths coincides. However, for the purposes of clarity, in FIG. 4 and the subsequent figures we have shown the two beam paths in parallel.

Processing unit 110 and camera device 10 may also be arranged in a single housing near the vehicle roof i.e., near the upper edge of windshield 12. However, processing unit 110 and camera device 10 may also be arranged in different places within the vehicle. In an exemplary embodiment, processing unit 110 is integrated into display unit 21.

In first process step 31 of FIG. 2, an image of the vehicle's surrounding area is captured by camera 100 with the help of first beam path 103. Herein, the image captured depends on how camera device 10 is arranged in the vehicle, and also on the size of opening 109 in the housing of camera device 10, and also on the setting of first lens 101. Herein, opening 109 has a transparent cover, e.g., a transparent plastic disk. Furthermore, a third lens may be arranged there. When second process step 34 is performed, in first sub-step 42 radiation source 121 is switched on by control unit 112 via sixth data circuit 122 for the duration of the time period during which the image is captured. This is accomplished by applying a voltage to radiation source 121. FIG. 4 does not show the voltage source. The beam, which is bundled by reflector 123, is radiated into the vehicle's interior. The beam that is radiated is invisible to the human eye. The radiation source is designed as, for example an infra-red beam diode or an infra-red beam diode array that includes a plurality of infra-red beam diodes. If the interior of the vehicle is illuminated by radiation source 121, the infra-red radiation that is reflected in the vehicle's interior passes through second lens 107 along second beam path 108 into camera device 10 and reaches infra-red filter 106. This filter only allows infra-red radiation through, so that visible light from the vehicle interior does not reach camera 100. Thus, for example it is possible for the vehicle interior to be captured independently of visible light. Illumination of the interior is only dependent on the intensity of radiation source 121. Thereafter, the filtered infra-red radiation passes to second deviation mirror 104, then to first deviation mirror 102, then to first lens 101 and into camera 100. Second deviation mirror 104 has an adjustment device 30. In the figure only a mounting 130 of this adjustment device is shown. An electric motor, a control unit and a power supply are not shown. With the help of this adjustment device, second deviation mirror 104 can be rotated about an axis of rotation 131 within a certain angular range. As a result, the area of the interior, which is imaged by second lens 107 and via the second deviation mirror into camera 100, can be modified. This is particularly useful if a driver changes the position of his seat while driving and camera device 10 must continue to capture his facial section.

Sensors 116 may be designed as, for example, seat sensors, which supply information as to whether a seat is occupied. If a seat sensor reports that a seat is unoccupied, the camera can check whether this is true or whether there is movement, for example, on the seat indicating that the seat is in fact occupied. In such cases, an airbag is not deactivated and/or seat heating is not deactivated. Furthermore, sensors also include input elements via which, for example, a falling-asleep warning can be deactivated if the driver is wearing sunglasses since, his eyes cannot be seen by camera 100. Output units include audible and/or visual warning elements that may be embodied as, for example a loudspeaker, a warning light or a liquid crystal display. Evaluation unit 113 and control unit 112 may also be integrated in a device. Furthermore, control unit 112 controls the position of second deviation mirror 104 via a connection line (not shown), based on instructions transmitted from evaluation unit 113 via second data circuit 114. If an object being monitored by camera device 10 threatens to move beyond the visible range, the processing unit can in this way modify the visible range via the control means of the second deviation mirror. First data circuit 111 and fifth data circuit 120 constitute a connection between camera device 10 and processing unit 110. Herein, first data circuit 111 is used to transmit image information from camera 100 to processing unit 110, in particular to evaluation unit 113. Processing unit 110, in particular control unit 112, controls camera 100 via fifth data circuit 120. First data circuit 111 and fifth data circuit 120 may also be combined as a single data circuit.

Figure 5:
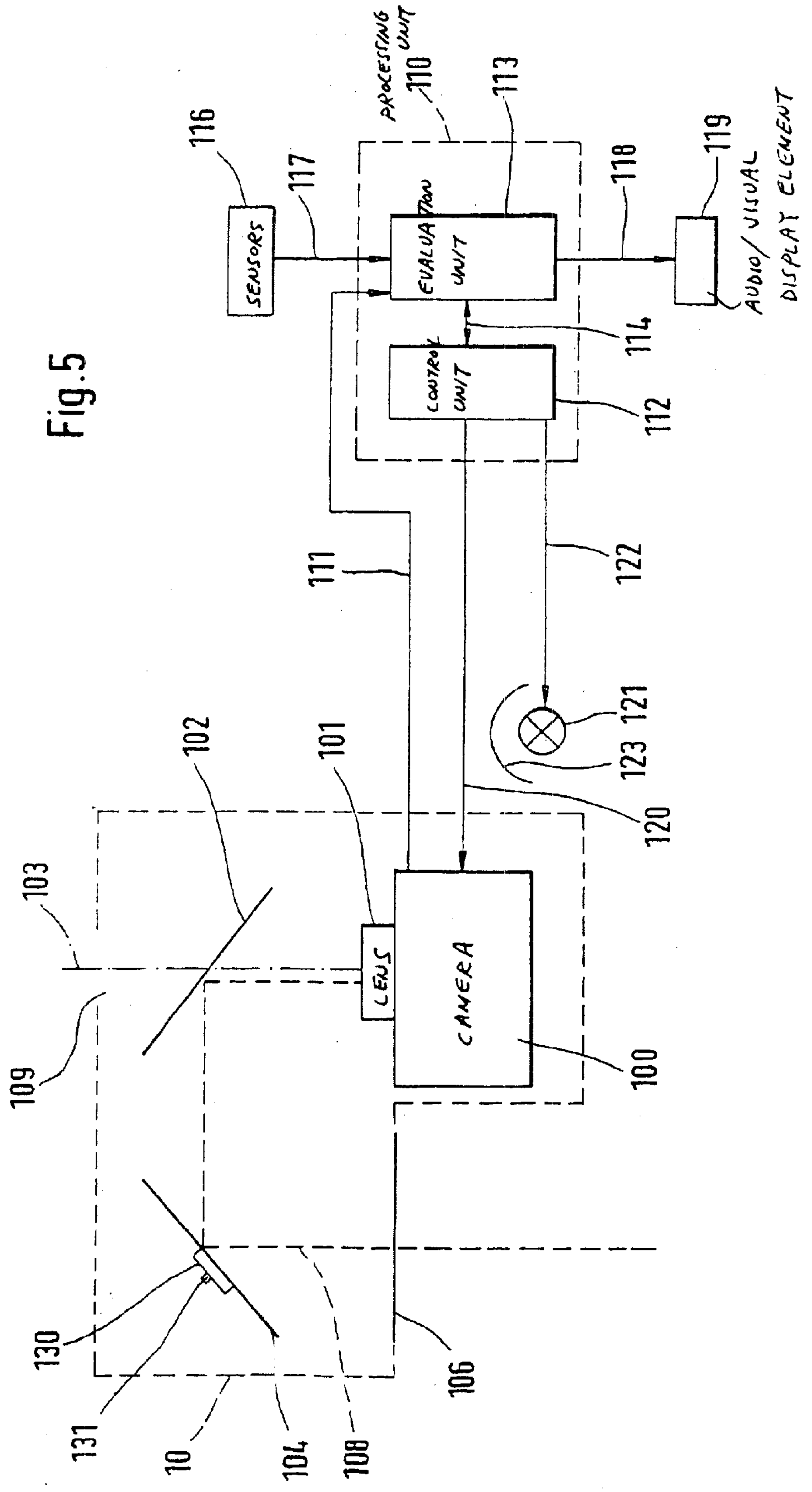
FIG. 5 shows a second embodiment of a device according to the present invention.

FIG. 5 shows a further exemplary embodiment according to the present invention of the device for monitoring a vehicle's surrounding area and the vehicle interior. Here and in the subsequent figures, once again the same reference numbers denote the same components. In FIG. 5, second beam path 108 leaves the housing of camera 10 after passing through infra-red filter 106. In FIG. 5, in order to distinguish the housing of camera device 10 from infra-red filter 106, we have shown the former using a broken line. The embodiment shown in FIG. 5 allows the camera device to be arranged parallel to the sectional plane and perpendicular to the vehicle roof. In an exemplary embodiment, in which camera device 10 is arranged perpendicular to the vehicle roof, the area around the camera as far as opening 109 is completely housed in the vehicle roof, while the area around the second deviation mirror protrudes into the vehicle interior, i.e., the sectional plane in the drawing is perpendicular to the vehicle roof. Aside from adjustment of second deviation mirror 104, essentially the optical properties of first lens 101 are used to produce an image in camera 100.

Figure 6:
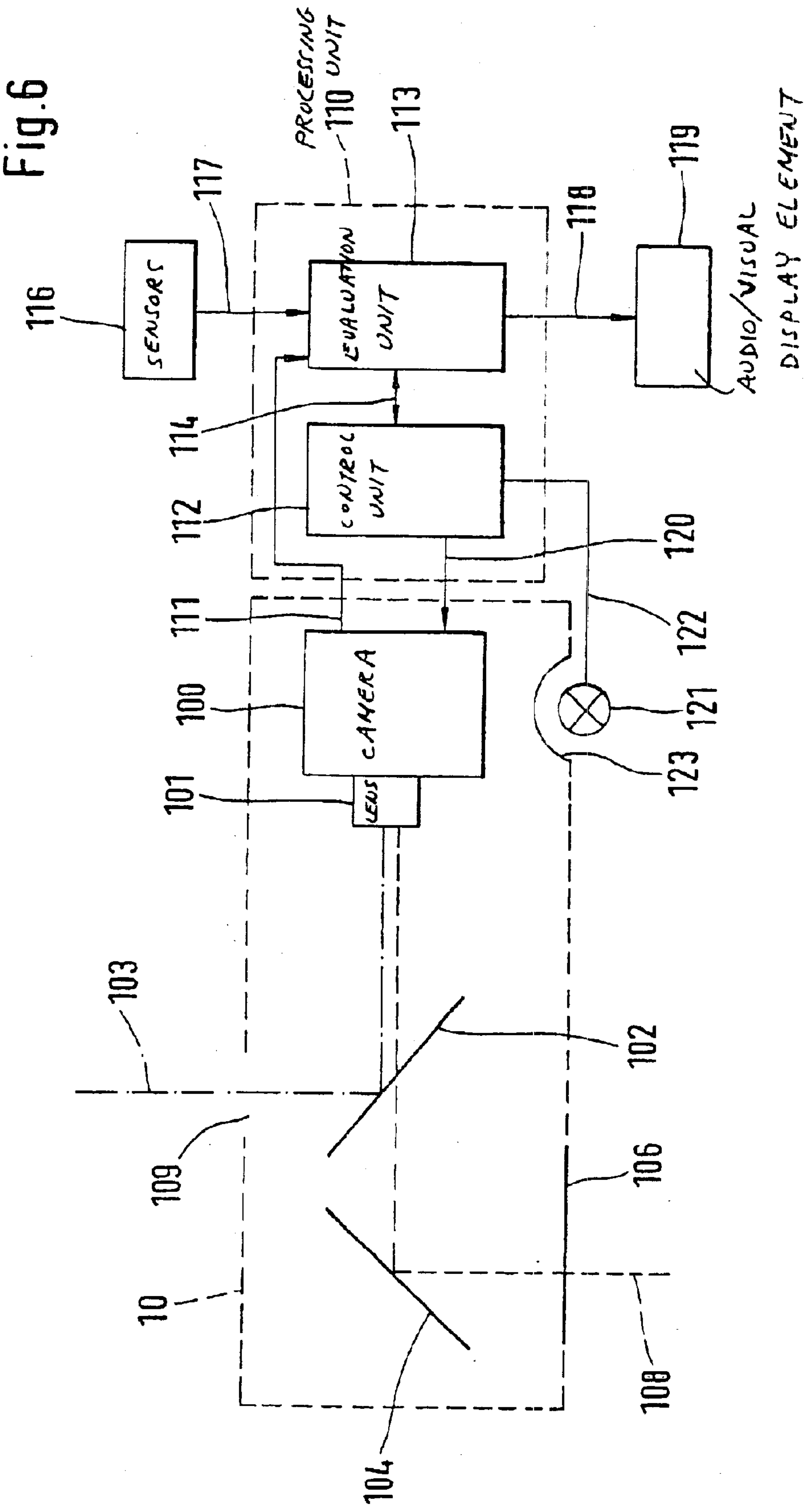
FIG. 6 shows a third embodiment of a device according to the present invention.

In FIG. 6, a further embodiment according to the present invention of the device for monitoring a vehicle's surrounding area the vehicle interior is shown. In this exemplary embodiment, camera 100 is arranged on a different side of first deviation mirror 102 from that in FIGS. 4 and 5. In this case, the light that follows first beam path 103 is reflected by first deviation mirror 102 onto camera 100. By contrast, the light that follows second beam path 108 is deviated by second deviation mirror 104, so that the beam passes through first deviation mirror 102, which is embodied as, for example a semi-transparent mirror, and ultimately reaches camera 100. Furthermore, in this exemplary embodiment reflector 123 is integrated into the housing of camera device 10, thus saving space. However, radiation source 121 may also be arranged in a favorable position in the vehicle some distance away from camera device 10. In addition, a plurality of radiation sources may be provided in the vehicle to ensure the vehicle's interior is optimally illuminated.

Figure 7:
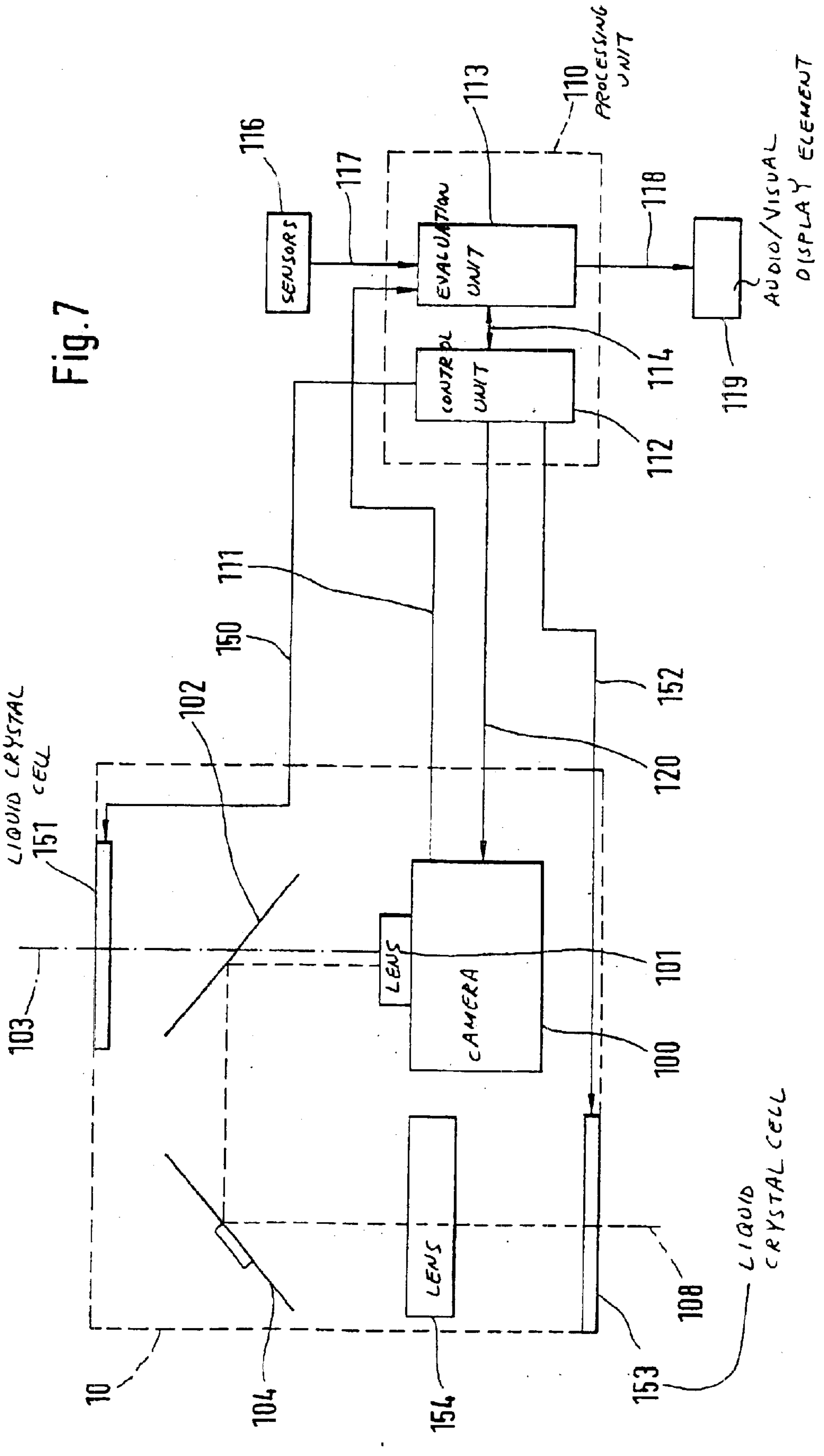
FIG. 7 shows a fourth embodiment of a device according to the present invention.

FIG. 7 shows a device for performing the method according to the present invention described in FIG. 3. Instead of opening 109, an electro-optical light valve in the form of a first liquid crystal cell 151 is placed in first beam path 103. First liquid crystal cell 151 can be controlled by control unit 112 via a control line 150, so that it is possible to switch first liquid crystal cell 151 back and forth between a transmissive and an absorptive state. The structure of the liquid crystal cell is not shown in detail in the drawing, nor is the power supply shown. Herein, first liquid crystal cell 151 may be embodied so that a liquid crystal between two glass substrates is arranged between two transparent electrodes and influences the polarizing direction of light in different ways based on an electrical field that is applied. By arranging polarizing films on the glass substrates, it is possible to establish a desired level of absorption of light based on the voltage applied to the transparent electrodes or, respectively, a predefined maximum transmission of light based on the glass substrate, the polarizers and the liquid crystal. Furthermore, a second liquid crystal cell 153 is provided that can be controlled by control unit 112 via a control line 152 and is arranged in second beam path 108. In first process step 31, first liquid crystal cell 151 is switched over to a transparent state and second liquid crystal cell 153 is switched over to an absorptive state. In this case, only the light from the vehicle's surrounding area enters camera 100 along first beam path 103. In second process step 34, first liquid crystal cell 151 is then switched over to its absorptive state and second liquid crystal cell 153 is switched over to its transmissive state. In this case, light passes along second beam path 108 through a third lens 154 and via second deviation mirror 104 and first deviation mirror 102 into camera 100. In order to avoid overlap, an intermediate step in which both liquid crystal cells 151 and 153 are switched over to their absorptive state may be inserted between the two process steps. This is recommended in particular at low temperatures, because in such cases switching over of the liquid crystal may be subject to a delay and maximum absorption and transmission, respectively, are not reached until the electrical field has been present for some time. By contrast with the exemplary embodiments shown in FIGS. 4 to 6, in the device shown in FIG. 7 visible light also enters camera 100 along second beam path 108.

Furthermore, in the case of all the aforementioned exemplary embodiments, two closely adjacent cameras, whose first and second beam paths are offset slightly relative to one another, may be provided instead of single camera 100. This allows images to be captured stereoscopically. With the help of suitable calculations performed by evaluation unit 113, conclusions regarding the distances to individual objects can be drawn from the captured stereoscopic images. This is advantageous in the case of detection of objects, e.g., road signs.

Figure 8A:
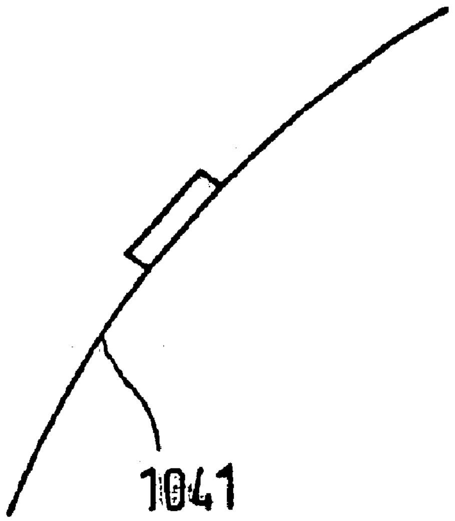
FIG. 8*a* shows a first embodiment of a deviation mirror according to the present invention.
Figure 8B:
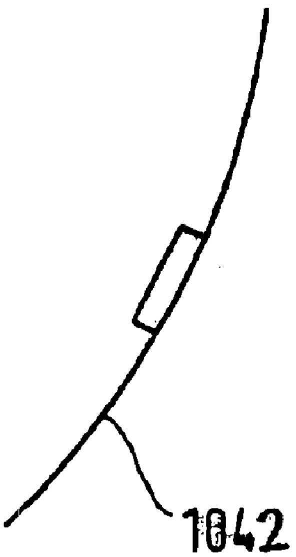
FIG. 8*b* shows a second embodiment of a deviation mirror according to the present invention.

FIGS. **8*a* and 8*b* show exemplary embodiments of second deviation mirror 104. In FIG. 8*a*, a second deviation mirror 1041 is concave, and in FIG. 8*b* a second deviation mirror 1042 is convex. It is feasible to use either deviation mirror 1041 or deviation mirror 1042 as a second deviation mirror 104. Because the mirror is embodied in this way, the area visible to the camera can be modified. The mirror shown in FIG. 8***b* can be used to enlarge the beam area, whereas the mirror shown in FIG. 8*a* can be used to limit the beam area; this is accomplished due to the differing curvature of the respective mirrors.

What is claimed is:

1. A method for monitoring an interior of a motor vehicle and a surrounding area of the motor vehicle, comprising:

(1) capturing an image of at least part of the surrounding area of the motor vehicle by a first optical opening of a camera device;

(2) capturing an image of at least part of the interior of the motor vehicle by a second optical opening of the camera device, the steps (1) and (2) being performed alternately; and (3) transmitting the images obtained in steps (1) and (2) to a processing unit.

2. The method according to claim 1, wherein:

the at least part of the surrounding area of the vehicle is in a direction of travel.

3. The method according to claim 1, wherein:

the at least part of the interior of the vehicle includes parts of a body of a driver.

4. The method according to claim 1, wherein step (1) includes illuminating the interior of the vehicle by a radiation source, the radiation source emitting a radiation at least substantially invisible to the human eye.

5. The method according to claim 4, wherein:

the radiation source is an infra-red radiation source.

6. A method for monitoring an interior of a motor vehicle and a surrounding area of the motor vehicle, comprising:

(1) capturing an image of at least part of the surrounding area of the motor vehicle by a camera device;

(2) capturing an image of at least part of the interior of the motor vehicle by the camera device, the steps (1) and (2) being performed alternately; and (3) transmitting the images obtained in steps (1) and (2) to a processing unit;

wherein step (2) includes:

superimposing the at least part of the interior of the vehicle visible to the camera device on the at least part of the surrounding area of the vehicle visible to the camera device; and determining the image of the at least part of the interior of the vehicle by subtracting the image of the at least part of the surrounding area.

7. The method according to claim 1, wherein:

only an image of an area surrounding the motor vehicle visible to the camera device is captured in the step (1); and only an image of the interior of the motor vehicle visible to the camera device is captured in the step (2).

8. The method according to claim 7, wherein:

switching back and forth between the step (1) the step (2) is accomplished via at least one light valve.

9. The method according to claim 8, wherein:

the at least one light valve is an electro-optical light valve.

10. The method according to claim 1, wherein an image captured is only a partial area of a maximum image that may be captured by the camera device, the partial area of the maximum image including at least one of image rows, image columns, and image pixels, and wherein the method further comprises:

switching back and forth between capturing a partial area of the interior and a partial area of the surrounding area;

processing by the processing unit the partial areas captured; and capturing a next partial area.

11. The method according to claim 1, further comprising:

capturing a face of a driver, the face including eyes of the driver.

12. The method according to claim 1, further comprising:

capturing at least one of road markings and a position of the vehicle relative to the road markings.

13. The method according to claim 11, further comprising:

evaluating at least one of the face of the driver and a position of the vehicle relative to road markings to determine at least one of whether the eyes of the driver are open and whether the vehicle is moving beyond a predefined area of the road markings; and issuing at least one of a visual warning and an audible warning based on the evaluation.

14. The method according to claim 1, further comprising:

capturing road signs.

15. The method according to claim 1, further comprising:

determining at least one of a number of people in the vehicle and a seat occupancy.

16. The method according to claim 15, further comprising:

deactivating at least one of an airbag and a seat heater of a corresponding seat when the corresponding seat is one of empty and occupied by a child seat.

17. The method according to claim 1, further comprising:

capturing lip movements of a person in the vehicle to support a speech input system.

18. The method according to claim 17, wherein:

the person is a driver of the vehicle.

19. A device for monitoring an interior of a motor vehicle and a surrounding area of the motor vehicle, comprising:

a camera device having a first optical opening and a second optical opening, wherein the camera device is configured to alternately capture an image of at least part of the interior of the motor vehicle by the first optical opening and capture an image of at least part of the surrounding area of the motor vehicle by the second optical opening; and a processing unit connected to the camera device, the images captured by the camera device transmitted to the processing unit.

20. The device according to claim 19, wherein:

a first beam path of the camera device points in a direction of a road in front of the vehicle; and a second beam path of the camera device points in a direction of the interior.

21. The device according to claim 20, wherein:

the second beam path of the camera device points in a direction of a driver in the interior.

22. The device according to claim 19, further comprising:

an illumination unit configured to emit a radiation at least substantially invisible to the human eye, the illumination unit controlled by the processing unit.

23. The device according to claim 22, wherein:

the radiation is infra-red radiation.

24. The device according to claim 19, further comprising:

an infra-red filter arranged in the camera device.

25. The device according to claim 24, wherein:

the infra-red filter is arranged in the second beam path in the direction of the interior.

26. The device according to claim 19, further comprising:

at least one light valve arranged in the camera device.

27. The device according to claim 26, wherein:

the at least one light valve is a liquid crystal cell.

28. The device according to claim 19, further comprising:

at least one deviation mirror arranged in the camera device.

29. The device according to claim 28, wherein:

the at least one deviation mirror is semi-transparent.

30. The device according to claim 29, wherein:

the at least one deviation mirror is one of concave and convex.

31. The device according to claim 19, wherein:

the camera device has a single camera.

32. The device according to claim 31, wherein:

the single camera is one of a CCD camera and a CMOS camera.

33. The device according to claim 19, wherein:

the camera device has at least two cameras for capturing images stereoscopically.

34. The device according to claim 19, further comprising:

at least one of visual output units and acoustic output units connected to the processing unit, the at least one of visual output units and acoustic output units configured to issue a warning to a driver when one of eyes of the driver are closed and the vehicle is about to move beyond a marked area of a road.

35. The device according to claim 19, wherein:

the camera device is one of arranged in an upper part of a windshield and integrated into a roof of the vehicle.

36. The device according to claim 28, further comprising:

an adjustment device configured to adjust the at least one deviation mirror so that at least eyes and lips of a driver can be seen in the image of the interior of the vehicle captured by the camera device.

37. A device for monitoring an interior of a motor vehicle and a surrounding area of the motor vehicle, comprising:

a camera device having a first optical opening and a second optical opening, wherein the camera device is configured to alternately capture an image of at least part of the interior of the motor vehicle by the first optical opening and capture an image of at least part of the surrounding area of the motor vehicle by the second optical opening; and a processing unit connected to the camera device, the images captured by the camera device transmitted to the processing unit;

wherein the image of at least part of the interior of the motor vehicle is determined by:

superimposing the at least part of the interior of the vehicle visible to the camera device on the at least part of the surrounding area of the vehicle visible to the camera device; and determining the image of the at least part of the interior of the vehicle by subtracting the image of the at least part of the surrounding area.

* * * * *

UNITED STATES PATENT AND TRADEMARK OFFICE

CERTIFICATE OF CORRECTION

PATENT NO. : 6,920,234 B1 
APPLICATION NO. : 09/743305
DATED : March 5, 2001
INVENTOR(S) : Winfried Koenig et al.

It is certified that error appears in the above-identified patent and that said Letters Patent is hereby corrected as shown below:

Column 1, line 18, change “detected in the Then,” to --detected in the images. Then, --

Column 1, line 50, change “source, preferably one” to --source, for example one--

Column 1, line 56, change “and of the interior; a processing” to --and the interior. A processing--

Column 1, line 62, delete “in particular”

Column 1, line 63, change “In particular, if the interior” to --for example, if the interior--

Column 1, line 67, change “Thus alternating monitoring” to --Thus, alternating monitoring--

Column 2, line 2, change “radiation source” to --radiation source,--

Column 2, line 3, change “beam path which” to --beam path that--

Column 2, line 11, change “terms, which means” to --terms. This means--

Column 2, line 13, delete “particularly”

Column 2, line 13, change “to carry out” to --to perform--

Column 2, line 17, change “valve, in particular” to --valve, for example--

Column 2, lines 24-25, change “In particular,” to --For example,--

Column 2, line 25, change “may be carried out” to --may be performed--

Column 2, line 36, change “in particular” to --for example--

UNITED STATES PATENT AND TRADEMARK OFFICE

CERTIFICATE OF CORRECTION

PATENT NO. : 6,920,234 B1
APPLICATION NO. : 09/743305
DATED : March 5, 2001
INVENTOR(S) : Winfried Koenig et al.

It is certified that error appears in the above-identified patent and that said Letters Patent is hereby corrected as shown below:

Column 2, line 36, change “as well as the road markings and,” to --the road markings, and--

Column 11, line 56, change “the step (1) the step (2)” to --the step (1) and the step (2)--

Column 13, lines 28-29, change “one of the eyes of the driver are closed” to --one of the eyes of the driver is closed--

Signed and Sealed this

First Day of August, 2006

JON W. DUDAS
*Director of the United States Patent and Trademark Office*

UNITED STATES PATENT AND TRADEMARK OFFICE

CERTIFICATE OF CORRECTION

PATENT NO. : 6,920,234 B1
APPLICATION NO. : 09/743305
DATED : July 19, 2005
INVENTOR(S) : Winfried Koenig et al.

It is certified that error appears in the above-identified patent and that said Letters Patent is hereby corrected as shown below:

Column 1, line 18, change “detected in the Then,” to --detected in the images. Then, --

Column 1, line 50, change “source, preferably one” to --source, for example one--

Column 1, line 56, change “and of the interior; a processing” to --and the interior. A processing--

Column 1, line 62, delete “in particular”

Column 1, line 63, change “In particular, if the interior” to --for example, if the interior--

Column 1, line 67, change “Thus alternating monitoring” to --Thus, alternating monitoring--

Column 2, line 2, change “radiation source” to --radiation source,--

Column 2, line 3, change “beam path which” to --beam path that--

Column 2, line 11, change “terms, which means” to --terms. This means--

Column 2, line 13, delete “particularly”

Column 2, line 13, change “to carry out” to --to perform--

Column 2, line 17, change “valve, in particular” to --valve, for example--

Column 2, lines 24-25, change “In particular,” to --For example,--

Column 2, line 25, change “may be carried out” to --may be performed--

Column 2, line 36, change “in particular” to --for example--

UNITED STATES PATENT AND TRADEMARK OFFICE

CERTIFICATE OF CORRECTION

PATENT NO. : 6,920,234 B1
APPLICATION NO. : 09/743305
DATED : July 19, 2005
INVENTOR(S) : Winfried Koenig et al.

It is certified that error appears in the above-identified patent and that said Letters Patent is hereby corrected as shown below:

Column 2, line 36, change “as well as the road markings and,” to --the road markings, and--

Column 11, line 56, change “the step (1) the step (2)” to --the step (1) and the step (2)--

Column 13, lines 28-29, change “one of the eyes of the driver are closed” to --one of the eyes of the driver is closed--

This certificate supersedes Certificate of Correction issued August 1, 2006.

Signed and Sealed this

Tenth Day of October, 2006

JON W. DUDAS
*Director of the United States Patent and Trademark Office*